US005454876A

United States Patent [19]
Downey

[11] Patent Number: 5,454,876
[45] Date of Patent: Oct. 3, 1995

[54] PROCESS FOR REDUCING LEAD LEACHATE IN BRASS PLUMBING COMPONENTS

[75] Inventor: Jerome P. Downey, Parker, Colo.

[73] Assignee: 21st Century Companies, Inc., Tyler, Tex.

[21] Appl. No.: 285,007

[22] Filed: Aug. 2, 1994

[51] Int. Cl.⁶ ........................................ F23J 1/00
[52] U.S. Cl. ............................... 134/3; 134/22.1
[58] Field of Search .................. 134/2, 3, 22.1, 134/22.11; 148/240, 250

[56] References Cited

U.S. PATENT DOCUMENTS

| | | | |
|---|---|---|---|
| 3,669,765 | 6/1972 | Bradshaw et al. | 148/6.16 |
| 3,764,399 | 10/1973 | Caule | 148/6.15 |
| 3,779,842 | 12/1973 | Grunwald et al. | 156/18 |
| 3,898,137 | 8/1975 | Dueber et al. | 204/43 G |
| 3,905,907 | 9/1975 | Shiga | 252/79.4 |
| 3,940,303 | 2/1976 | Caule | 148/31.5 |
| 3,950,193 | 4/1976 | Caule | 148/31.5 |
| 3,975,308 | 8/1976 | Myles et al. | 252/520 |
| 4,006,041 | 2/1977 | Fabregas et al. | 148/6.16 |
| 4,182,639 | 1/1980 | Pignocco et al. | 148/6.17 |
| 4,233,088 | 11/1980 | Kronstein | 148/6.16 |
| 4,452,650 | 6/1984 | Caule | 148/31.5 |
| 4,478,651 | 10/1984 | Brock et al. | 148/31.5 |
| 4,582,556 | 4/1986 | Butt et al. | 156/525 |
| 4,615,643 | 10/1986 | Gouvenot | 405/128 |
| 4,699,889 | 10/1987 | Sales et al. | 501/22 |
| 4,737,356 | 4/1988 | O'Hara et al. | 423/659 |
| 4,981,553 | 1/1991 | Tytgat et al. | 156/666 |
| 5,076,941 | 12/1991 | Boffardi et al. | 210/753 |
| 5,118,367 | 6/1992 | Starinshak | 148/262 |
| 5,193,936 | 3/1993 | Pal et al. | 405/128 |

Primary Examiner—Scott Kastler
Attorney, Agent, or Firm—Dorn, McEachran, Jambor & Keating

[57] ABSTRACT

A process for treating brass plumbing components to reduce leachable lead when the component is subsequently exposed to water includes exposing the brass component in an aqueous solution containing a desired concentration of chloride and pyrophosphate, with the chloride ion promoting the dissolution of lead from the brass component and the pyrophosphate ion preventing saturation of the solution with lead insuring continuation of the dissolution process.

20 Claims, No Drawings

PROCESS FOR REDUCING LEAD LEACHATE IN BRASS PLUMBING COMPONENTS

THE FIELD OF THE INVENTION

Leaded brass has been used in the manufacture of water flow fixtures such as shower heads, faucets, tub spouts and the like since such devices first came into modern use. The Environmental Protection Agency has issued regulations which limit the maximum quantity of lead that is permitted to be leached into the water from such plumbing fixtures during an overnight dwell or extensive period of non-use. Most faucets presently in use will meet the maximum leachable lead limits established by the EPA prior to 1993. However, the EPA is now reducing the maximum permissible limits, and it is widely anticipated that by the end of 1994, many faucet products currently in production will not meet the revised limits. Consequently, most of the manufacturers of water flow devices such as faucets are expending substantial effort in the redesign of their products or their manufacturing processes to meet the anticipated EPA guidelines for leachable lead.

The EPA has delegated to the National Sanitation Foundation responsibility to develop the protocol which will determine the quantity of lead leaching into the potable water supply from regulated devices such as faucets. It is anticipated that the protocol will evaluate the lead leached into the water supply during the first 19 days after installation, and that on average faucets will be required to contribute less than 11 micrograms per liter of lead per day to the water sampled after filling and testing according to the precisely defined procedure. The procedure will be defined in a document known as the NSF-61 standard.

The present invention is directed to a process for treating brass plumbing products in order to significantly reduce the quantity of lead leached into the water. The process is specifically directed toward reducing the total leachable lead over the prescribed time period in the most cost effective manner. Clearly, there are processes which will reduce the leachable lead to amounts which meet the standard, but these processes are so expensive or time consuming as to be commercially unacceptable. The present invention provides a process which is both commercial and one which will provide a product which will meet or exceed the anticipated NSF-61 standard for leachable lead.

SUMMARY OF THE INVENTION

The present invention relates to a process for treating brass to reduce the quantity of lead which may subsequently be leached from the brass when it is exposed to water.

The primary purpose of the invention is to provide a process for the treatment of brass components which rapidly removes at least a portion of the lead on the surface of the brass, thus reducing the potential for lead to leach from the brass when subsequently exposed to water.

Another purpose of the invention is to render typical faucet designs made out of typical materials (most notably CDA 360 brass and CDA 844 cast red brass) acceptable under the anticipated NSF-61 standard after treatment times of less than five minutes, which are relatively easy to implement in a production facility.

Another purpose of the invention is to render faucet components in typical designs and typical materials acceptable under the NSF-61 standard after a treatment which uses only economical and readily available chemicals and process equipment.

Another purpose of the invention is to render faucet components in typical designs and typical materials acceptable without perceptible deterioration of the cosmetic appearance or function due to discoloration or excessive removal of copper or zinc.

Another purpose of the invention is a process for treating brass components which uses chloride and pyrophosphate ions in aqueous solution.

Another purpose is a treatment process of the type described in which the brass component is exposed to an aqueous solution of chloride and pyrophosphate ions for a predetermined time period, the solution being maintained at predetermined temperature.

Another purpose is a treatment process as described in which the aqueous treatment solution is re-circulated to continually remove dissolved lead or insoluble lead precipitate from the treatment tank.

Another purpose of the invention is to provide a brass treatment process in which a brass component is exposed to an aqueous solution containing a mixture of active ingredients which both selectively dissolve metallic lead at an accelerated rate while leaving the brass substantially unaffected and also sequester the lead in solution such that the solution reaction for lead does not naturally come to a halt.

Another purpose of the invention is to provide a brass treatment process which prevents lead from subsequently leaching from the brass into water by creating a barrier about any lead particles which remain on the brass.

Other purposes will appear in the ensuing specification and claims.

DESCRIPTION OF THE PREFERRED EMBODIMENT

The present invention is specifically directed to a process for treating brass, and more specifically brass plumbing components such as faucet bodies, shower heads and well pumps, so as to reduce the leachable lead. The process described will economically reduce leachable lead to an amount which will be acceptable under the anticipated standards to be set by the National Sanitation Foundation and specifically the standard known as NSF-61. It is currently anticipated that the NSF-61 standard will require the concentration of lead found in solution ejected from the faucet, to be on average, less than 11 micrograms per liter (ug/L) over the first 19 days of testing when the solution is collected and the concentration calculated according to the NSF-61 standard. This is an accumulated leachable lead total and is basically determined in a protocol issued by the NSF. Although there are a number of processes which may treat brass to reduce the potential leachable lead, it is essential that such a process be commercially viable in terms of the cost and time involved in the treatment process so that the faucets or other plumbing products which are treated will continue to be viable in the marketplace.

The present invention is specifically directed to a process in which the brass component, either a faucet body for single handle or double handle use, is exposed to an aqueous solution containing desired concentrations of chloride and pyrophosphate. Sodium chloride and sodium pyrophosphate are the preferred salts for introducing chloride and pyrophosphate in solution although those skilled in the art will understand that other chloride and pyrophosphate sources such as other polyphosphates and hydrochloric acid may also be used. The invention will be described using sodium chloride and sodium pyrophosphate, although it should not be so limited. The brass component will be exposed to the described solution, for example, by immersion or by flushing.

The applicant herein has cause to be instituted numerous tests of the described process in which the time of exposure, the concentration of sodium chloride and sodium pyrophosphate decahydrate and the temperature have all been varied. Specifically, tests have established that brass plumbing components immersed in an aqueous solution containing 15 g/L of sodium chloride (a concentration of 0.26 molar chloride), and 90 g/L of sodium pyrophosphate (a concentration of 0.20 molar pyrophosphate), at a temperature of 60° C. and immersed at time intervals from 3.5 min. to 30 min. will subsequently pass the NSF-61 leachable lead test. The tests involved immersing brass faucet products for time periods of 3.5 min., 7.5 min., 15 min. and 30 min. In each instance the products all passed the NSF-61 test in that the amount of lead leached over the 19-day test period was substantially less than the anticipated standard of 11 ug of lead per liter of water.

Further tests were run in which the treatment lasted for 3.5 min. and the following temperatures and concentrations were utilized. In all instances the concentration of sodium chloride was 15 g/L (a concentration of 0.26 molar chloride). Brass faucet parts were immersed for 3.5 min. in the following aqueous solutions, including the described sodium chloride: 90 g/L of sodium pyrophosphate (a concentration of 0.20 molar pyrophosphate) with the solution being maintained at 35° C.; 90 g/L of sodium pyrophosphate (a concentration of 0.20 molar pyrophosphate) with the solution being maintained at 70° C.; 81 g/L of sodium pyrophosphate (a concentration of 0.18 molar pyrophosphate) with the aqueous solution being maintained at 60° C.; and 45 g/L of sodium pyrophosphate (a concentration of 0.10 molar pyrophosphate) with the aqueous solution being maintained at 60° C. In each of the above tests the accumulated total of leachable lead over the 19-day test period prescribed in NSF-61 was less than 11 ug/L.

Additional tests were run in which the solution was maintained at a temperature of 60° C., the immersion time was 3.5 minutes, and the amounts of sodium chloride and sodium pyrophosphate each varied from 25 g/L to 120 g/L (a concentration of 0.42 molar to 2.1 molar chloride and 0.06 molar to 0.27 molar pyrophosphate). In each instance the accumulated leachable lead, as per the NSF-61 protocol, was less than 11 ug/L.

Based on the tests described above, a brass faucet product immersed in an aqueous solution of from 10 g/L to 120 g/L of sodium chloride (a concentration of 0.17 molar chloride to 2.1 molar chloride); sodium pyrophosphate in an amount ranging from approximately 25 g/L to approximately 120 g/L (a concentration of 0.06 molar pyrophosphate to 0.27 molar pyrophosphate); an immersion time of from approximately 3.5 min. to approximately 30 min.; with the solution maintained at a temperature of from approximately 35° C. to approximately 70° C., will result in a brass product which will pass the NSF-61 leachable lead protocol. The preferred embodiment of the invention is to utilize a time period of 3.5 min., although it is anticipated that initial use of the invention may have an immersion time of 5 min. The preferred concentration is 15 g/L of sodium chloride (0.26 molar chloride) and 90 g/L of sodium pyrophosphate (0.20 molar pyrophosphate). It is preferred to maintain the aqueous solution at a temperature of approximately 60° C. In addition to the above-described parameters, it is preferred that the aqueous solution be continuously circulated and be air agitated for a constant infusion of oxygen. The solution pH should be maintained in a range of 9.5 to 10.5, with a pH of 10 being preferred.

When the brass component is immersed in the described aqueous solution, dissolved oxygen is converted to hydroxyl ions by an electron accepting reduction reaction with water, the electrons being provided by conversion of metallic lead at the brass surface to lead ions in aqueous solution.

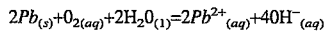

$$2Pb_{(s)} + O_{2(aq)} + 2H_2O_{(l)} = 2Pb^{2+}_{(aq)} + 4OH^-_{(aq)}$$

The chloride ions in solution accelerate the dissolution of metallic lead. The pyrophosphate ions in solution chelate the lead ions in a complex such as $PbP_2)_7^{2-}$, thus reducing the chemical activity of the $Pb^{2+}$ species and preventing the above-described conversion of metallic lead from terminating.

In summary, five factors in the invention ensure that lead is removed expeditiously:

1. Aeration of the solution is required to ensure an adequate supply of dissolved oxygen, without which the lead solution reaction set forth above would not occur.

2. Chloride ions are required to accelerate the rate of lead dissolution.

3. Pyrophosphate ions are required to sequester the dissolved lead in solution, thus preventing the above lead solution reaction from reaching equilibrium.

4. Agitation of the solution is required to ensure that fresh supplies of the reagents participating in the reaction rapidly are brought to the reaction site at the faucet surface, and that the products of reaction are rapidly removed.

5. A moderately elevated temperature is required to accelerate the rate of reaction. However, too high a temperature would reduce the availability of the required dissolved oxygen.

It is believed that with the pH in the described range of 9.5 to 10.5 the surface lead will be dissolved as described. If the pH is acidic it is anticipated that a barrier of chloropyromorphite or other lead phosphate compounds may form about lead particles remaining on the brass.

Whereas the preferred form of the invention has been shown and described herein, it should be realized that there may be many modifications, substitutions and alterations within the scope of the following claims.

The embodiments of the invention in which an exclusive property or privilege is claimed are defined as follows:

1. A process for treating brass components to reduce leachable lead when the component is subsequently exposed to water, the process including:

(a) exposing the brass component to an aqueous solution containing chloride in a concentration of from about 0.17 molar to about 2.1 molar and pyrophosphate in a concentration of from about 0.06 molar to about 0.27 molar;

(b) the brass component remaining exposed to the aqueous solution for a time period of from approximately 3.5 min. to approximately 30 min., with the temperature of the aqueous solution being in the range of from approximately 35° C. to approximately 70° C.

2. The process of claim 1 in which the concentration of pyrophosphate is approximately 0.20 molar.

3. The process of claim 1 in which the concentration of chloride is approximately 0.26 molar.

4. The process of claim 1 in which the time period of immersion is from approximately 3.5 min. to approximately 7.5 min.

5. The process of claim 4 wherein the immersion time is approximately 3.5 min.

6. The process of claim 1 wherein the solution is maintained at a temperature of approximately 60° C.

7. The process of claim 1 wherein the solution pH is maintained from 9.5 to 10.5.

8. The process of claim 7 wherein the solution pH is maintained at about 10.

9. The process of claim 1 wherein the solution is continually air agitated.

10. A process for treating brass components to reduce leachable lead when the component is subsequently exposed to water including exposing the brass component to an aqueous solution containing concentrations of chloride and pyrophosphate with the chloride ions promoting the dissolution of lead from the brass component and the pyrophosphate ions sequestering the dissolved lead in solution, preventing the lead solution reaction from reaching equilibrium.

11. The process of claim 10 wherein the aqueous solution is maintained at a temperature in the range of from approximately 35° C. to approximately 70° C.

12. The process of claim 11 wherein the aqueous solution is maintained at a temperature of approximately 60° C.

13. The process of claim 10 wherein the aqueous solution contains chloride in a concentration of from about 0.17 molar to about 2.1 molar and pyrophosphate in a concentration of from about 0.06 molar to about 0.27 molar.

14. The process of claim 13 wherein the concentration of pyrophosphate is approximately 0.20 molar.

15. The process of claim 10 wherein the brass component remains exposed to the aqueous solution for a time period ranging from approximately 3.5 min. to approximately 7.5 min.

16. The process of claim 13 wherein the concentration of chloride is approximately 0.26 molar.

17. The process of claim 10 wherein the solution pH is maintained from 9.5 to 10.5.

18. The process of claim 10 wherein the solution is continually air agitated.

19. A process for treating brass components to reduce leachable lead when the component is subsequently exposed to water, the process including exposing the brass component to an aqueous solution containing two kinds of active species, one of the species promoting the dissolution of lead from the brass component, with the other species sequestering the dissolved lead in solution preventing the lead solution reaction from reaching equilibrium.

20. The process of claim 19 wherein the solution is aerated to provide dissolved oxygen to insure lead dissolution.

* * * * *